Figure 1:
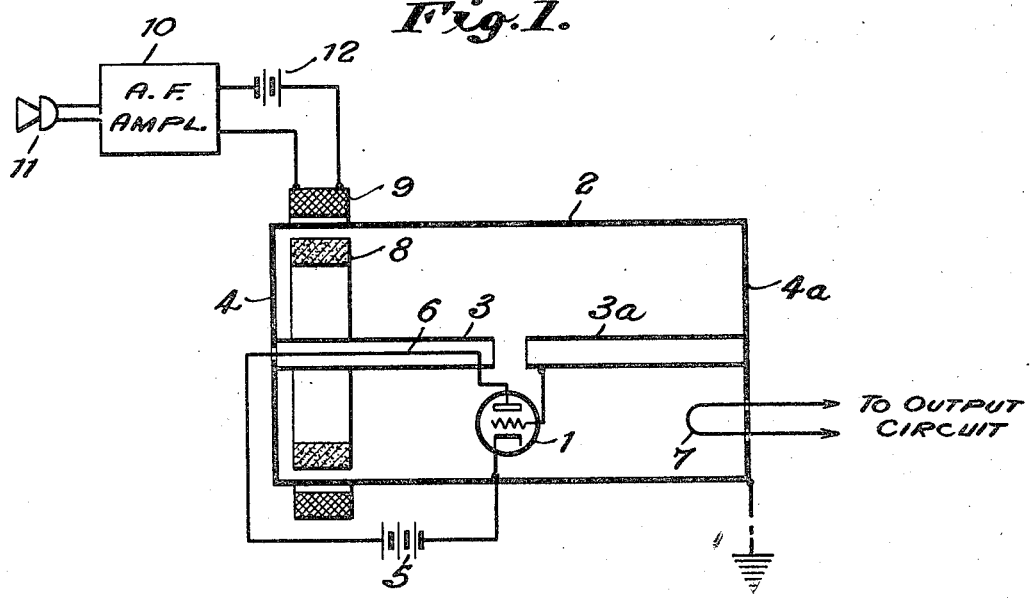

July 2, 1946.    W. L. CARLSON    2,402,948

TUNING ARRANGEMENT

Filed May 9, 1942

INVENTOR
Wendell L. Carlson
BY H. G. Grover
ATTORNEY

Patented July 2, 1946

2,402,948

UNITED STATES PATENT OFFICE 2,402,948

TUNING ARRANGEMENT

Wendell L. Carlson, Haddonfield, N. J., assignor to Radio Corporation of America, a corporation of Delaware Application May 9, 1942, Serial No. 442,291

12 Claims. (Cl. 179—171.5)

This invention relates to tuned circuits of the concentric line or cavity resonator type, and particularly to a novel method of and means for varying the frequency of such tuned circuits.

An object of the invention is to enable the electric constants of a concentric line type resonator to be varied by stationary magnetic means located in the interior of the resonator.

Another object is to provide a novel type of frequency modulation circuit employing magnetic means.

As is now known, a concentric line resonator is a tuned circuit comprising inner and outer concentric conductors connected together at one or more points in their lengths. Such resonant lines may be used as the frequency controlling element in an electron discharge device oscillator, or as an input or output circuit of an amplifier, or as a filter. Examples of concentric lines and the forms they may take are described in the article by Clarence W. Hansell entitled "Resonant lines for frequency control," published August, 1935, in "Electrical Engineering," pages 852 to 857, and in United States Patent No. 2,104,915, granted January 11, 1938, to B. J. Thompson, to which reference is made for a more detailed description.

For tuning or changing the resonant frequency of the resonant line, it is known among other things to change the physical length of the line, as is described, for example, in the Hansell article, supra. The present invention simplifies the tuning procedure, and provides a novel and simple means for quickly and efficiently changing the tuning of the resonant line.

Essentially, the invention consists in the use of a ring of suitable powdered magnetic material, such as powdered magnetite, located in the interior of the resonator and whose permeability is under the control of a source of current flowing in a modulating coil. The core or ring of powdered magnetic material is preferably positioned in the resonator at a place of high magnetic field and low electrostatic field. The exciting flux for the core or ring is produced either by a direct current or alternating current source and is preferably located outside of the resonant cavity. The core or ring may be so designed and excited that it works in a region of substantial linearity. In this operating region, an increase or decrease in the exciting flux produces a linear increase or linear decrease, respectively, in the permeability of the powdered core. Since the resonant frequency of the resonator is dependent in part upon the permeability of the magnetic core material, the present invention provides a method of varying the tuning of the resonator in response to a change in current in the modulating coil. By changing the saturation or exciting flux in the core, I am able to increase or decrease the permeability of the core, as a consequence of which there is a corresponding increase or decrease of inductance in the resonator. An increase in inductance of the resonator produces a decrease in frequency, while a decrease in inductance of the resonator produces an increase in frequency. There may also be a change of core loss (resistance) with variation of permeability. This may be minimized in several ways, for example, by reducing the iron powder particle size.

Figure 2:
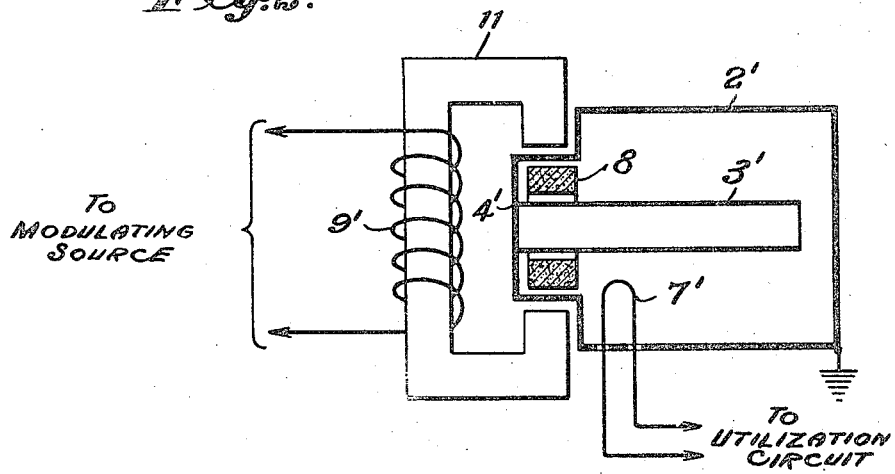

A description of the invention follows in conjunction with a drawing, wherein Figs. 1 and 2 show, by way of example only, two different embodiments of the invention.

Fig. 1 is a diagrammatic presentation of a push-pull oscillator circuit with magnetic means for varying the frequency of the oscillator in accordance with modulating potentials representative of speech waves impressed upon the modulating coil. The oscillator comprises a vacuum tube 1, in circuit with the frequency determining oscillatory circuit in the form of a concentric resonant line. This concentric line comprises an outer shell 2 having coaxial inner conductors 3, 3a placed end to end. The conductors 3, 3a are connected to the shell 2 by means of metallic end plates 4, 4a. The adjacent ends of the internal conductors 3, 3a are capacitively coupled together, as shown, or may be provided with cooperative capacitive elements such as plates or flat interleaving circular plates. If desired, one of the internal conductors can be provided with external means for varying its length in order to change the capacity between the internal conductors with a consequent change in the frequency of the concentric line. It is preferred, though not necessary, that the conductors 3, 3a be hollow. The grid of vacuum tube 1 is connected to one conductor 3a on one side of the gap while the anode of the vacuum tube is effectively connected to the other conductor 3 on the other side of the gap. This can be by a lead 6 extending through the interior of the hollow inner conductor 3 between the anode and a source of anode polarizing potential 5. The cathode is directly connected to the shell. The shell 2 can be connected to ground either directly or through a capacity. The lead 6 is insulated from the inner conductor 3 through which it runs. In practice, the electrical length of the concentric resonant line comprising the shell and the capacitively loaded inner conductors 3, 3a will be substantially one-half wavelength of the desired frequency while the physical length thereof may be much less due to the capacity effects. The two conductors 3, 3a will be in phase opposition. So far, the concentric line which has been described is generally of the type shown in the Thompson patent supra. In order to derive energy from the resonator, there is provided a coil or loop 7 placed in the interior of the concentric resonant line and extending to suitable externally located utilization apparatus, such as an amplifier, which in turn may be connected to a transmission line and an antenna.

In order to change the frequency of the resonant line there is provided in the interior of the line, in accordance with the invention, at a location of high current, a core or ring 8 of powdered or comminuted magnetic material. The location of the core 8 is at a place of high magnetic field and low electrostatic field of the resonator. As an example, this magnetic material may be powdered magnetite, with the iron particles held together by a suitable low-loss insulating binder. Surrounding the core 8, though externally of the shell 2, is a modulator coil 9 for inducing magnetic flux in the core 8. Modulating coil 9 is shown coupled to the output of an audio frequency amplifier 10 upon whose input is impressed suitable speech waves from a microphone 11. A biasing magnetic flux is provided by the battery 12. The core 8 normally reduces the natural frequency of the concentric line 10. By changing the permeability of the core 8 in accordance with the degree of excitation of the modulating coil 9, I am able to change the inductance of the resonant line and the tuning of the line. It is preferred that the core 8 operate in a region of substantial linearity wherein an increase or decrease in the exciting flux of the core will increase or decrease linearly, respectively, the permeability of the core, as a consequence of which there will be obtained an increase or decrease of the inductance of the resonant line. An increase in inductance will cause a decrease in the resonant frequency of the line while a decrease in the inductance will cause an increase in the resonant frequency of the line. In effect, the circuit of Fig. 1 shows a way in which the frequency of an oscillator can be modulated by magnetic means. Because the system of Fig. 1 employs alternating current in the modulating coil 9, it is preferred that the outer shell 2 be slotted around the periphery of the shell at the location between coil 9 and core 8. The slots in the shell 2 will reduce eddy current losses in the modulator circuit.

Although I have described and shown the use of alternating current for the modulating coil 9, it should be understood that, if desired, direct current can be employed for the modulating coil 9 to tune the high frequency resonator over a band of frequencies, in which case it will not be necessary to slot the outer conductor 2.

Fig. 2 illustrates another embodiment of the invention employing a single inner conductor for the concentric resonant line. In this figure, the concentric resonant line comprises an outer shell 2' and an inner conductor 3', both coupled together at one end by means of a metallic end plate 4'. The magnetic core 8 is located in the interior of the shell 2' at a location of high current. The end of the concentric line at which the inner and outer conductors are connected together is shown reduced in area and a U-shaped magnetic core 11 shown surrounding the reduced portion of the outer shell for changing the permeability of the core. A suitable coil 9' is wound around the central portion of the core 8 for applying suitable modulating potentials to change the permeability of the core 8 in a desired manner, in order to change the tuning of the concentric line. The energy may be abstracted from the concentric line by means of a suitable loop 7' extending to externally located utilization apparatus (not shown).

The concentric line system of the invention can be employed in different circuit arrangements and is not limited solely for use with oscillation generators.

What is claimed is:

1. A resonant circuit comprising an enclosed metallic cavity, a core of comminuted magnetic material located in said cavity, and means for tuning said resonant circuit including a modulating coil located externally of said cavity for producing an exciting flux in said core.

2. A resonant circuit comprising an enclosed metallic cavity, a core of comminuted magnetic material located in said cavity, and a coil located externally of said cavity for changing the permeability of said core in accordance with control potentials applied to said coil.

3. A resonant circuit comprising an enclosed metallic cavity, a core of magnetic material located in said cavity substantially solely at a location of high magnetic field and low electrostatic field, and a coil located externally of said cavity and surrounding said core for changing the permeability of said core in accordance with control potentials applied to said coil.

4. A resonant circuit comprising a pair of conductors having substantially uniformly distributed inductance and capacitance and so coupled as to form a tuned circuit, means for tuning said resonant circuit comprising a powdered magnetic core located between said conductors at a location of high current flow therein, a modulating coil externally of said conductors and surrounding said core for varying the permeability of said core.

5. A concentric line having an outer conductor and a coaxial inner conductor coupled together to form a tuned circuit, a core of powdered magnetic material in the interior of said outer conductor and surrounding one portion of the inner conductor, and means for varying the permeability of said core.

6. A concentric line having an outer conductor and a coaxial inner conductor coupled together to form a tuned circuit, a ring of powdered magnetic material in the interior of said outer conductor and surrounding said inner conductor at a location of high magnetic field, a coil surrounding said outer conductor at the location of said ring, and means for applying varying amounts of exciting potential to said coil.

7. A tuned circuit comprising a pair of coaxially arranged outer and inner surfaces of revolution so constructed and arranged as to form an oscillatory circuit, a stationary core of powdered magnetite between said surfaces, and means for varying the permeability of said ring in accordance with a characteristic of certain signal waves.

8. A frequency modulator comprising a metallic cavity forming a resonant circuit, a stationary core of powdered magnetic material located in said cavity at a location of high magnetic field and low electrostatic field, and means including a modulating coil located externally of said cavity for varying the permeability of said core in accordance with signal modulations, whereby a change in permeability of said core is accompanied by a change in the resonant frequency of said resonant circuit.

9. A frequency modulator comprising a metallic cavity forming a resonant circuit, a stationary core of powdered magnetic material located in said cavity at a location of high magnetic field and low electrostatic field, and means including a modulating coil located externally of said cavity for varying the permeability of said core in accordance with signal modulations, whereby a change in permeability of said core is accompanied by a change in the resonant frequency of said resonant circuit, said core operating in a region of substantial linearity where a change in the exciting flux causes a substantially linear change in the permeability of the core.

10. A resonant circuit comprising an enclosed metallic cavity, a core of comminuted magnetic material located in said cavity substantially solely at a location of high magnetic field and low electrostatic field, and means for tuning said resonant circuit including a modulating coil located externally of said cavity for producing an exciting flux in said core.

11. A concentric line having an outer conductor and coaxial inner conductor coupled together to form a tuned circuit, a ring of powdered magnetic material in the interior of said outer conductor and surrounding said inner conductor at a location of high magnetic field, a coil surrounding said outer conductor at the location of said ring, said outer conductor having a slot around at least a portion of its periphery at the location between said coil and core, and means for applying varying amounts of exciting potential to said coil.

12. A concentric line having an outer conductor and a coaxial inner conductor coupled together at one end to form a tuned circuit, a core of powdered magnetic material in the interior of said outer conductor near said one end and surrounding one portion of the inner conductor, said outer conductor having a portion of reduced diameter adjacent said core, and means for varying the permeability of said core comprising a U-shaped magnetic core surrounding said reduced portion.

WENDELL L. CARLSON.